US006886601B2

(12) United States Patent
Allen

(10) Patent No.: US 6,886,601 B2
(45) Date of Patent: May 3, 2005

(54) MULTI-COMPARTMENT AERIAL DUCT

(75) Inventor: Jerry L. Allen, Westfield Center, OH (US)

(73) Assignee: TVC Communications, L.L.C., Annville, PA (US)

( * ) Notice: Subject to any disclaimer, the term of this patent is extended or adjusted under 35 U.S.C. 154(b) by 0 days.

(21) Appl. No.: 10/401,222

(22) Filed: Mar. 27, 2003

(65) Prior Publication Data

US 2003/0183291 A1 Oct. 2, 2003

Related U.S. Application Data

(60) Provisional application No. 60/368,317, filed on Mar. 29, 2002.

(51) Int. Cl.[7] .................................................. F16L 3/00
(52) U.S. Cl. ...................... 138/107; 138/108; 138/116
(58) Field of Search ............................ 138/111, 115, 138/116, 117, 106, 107, 108; 248/58, 60, 61; 174/43, 70 A, 121 R, 122 R, 124 R

(56) References Cited

U.S. PATENT DOCUMENTS

| | | | | |
|---|---|---|---|---|
| 1,721,218 A | * | 7/1929 | Hood | 174/70 A |
| 2,007,999 A | * | 7/1935 | Brown | 138/107 |
| 2,585,054 A | * | 2/1952 | Stachura | 138/123 |
| 2,956,311 A | * | 10/1960 | Raydt et al. | 164/508 |
| 3,911,200 A | | 10/1975 | Simons et al. | 174/36 |
| 4,070,543 A | | 1/1978 | Thompson et al. | 174/87 |
| 4,399,319 A | | 8/1983 | Zinn | 174/47 |
| 4,582,093 A | | 4/1986 | Hubbard et al. | 138/111 |
| 4,729,409 A | | 3/1988 | Paul | 138/115 |
| 5,069,254 A | | 12/1991 | Vogelsang | 138/111 |
| 5,137,057 A | * | 8/1992 | Hummert, III | 138/107 |
| 5,226,456 A | * | 7/1993 | Semak | 138/107 |
| 5,236,016 A | | 8/1993 | Vogelsang | 138/115 |
| 5,289,556 A | | 2/1994 | Rawlyk et al. | 385/112 |
| 5,399,812 A | | 3/1995 | Woszczyna et al. | 174/97 |
| 5,442,136 A | | 8/1995 | Allen | 174/95 |
| 5,587,115 A | | 12/1996 | Allen | 264/1.24 |
| 5,677,023 A | * | 10/1997 | Brown | 428/36.6 |
| 5,678,609 A | * | 10/1997 | Washburn | 138/107 |
| 5,789,701 A | * | 8/1998 | Wettengel et al. | 174/41 |
| 5,922,995 A | | 7/1999 | Allen | 174/95 |
| 6,251,201 B1 | | 6/2001 | Allen | 156/47 |
| 6,262,371 B1 | | 7/2001 | Allen | 174/68.1 |
| 6,304,698 B1 | * | 10/2001 | Morris | 385/100 |
| 6,421,485 B2 | * | 7/2002 | Morris | 385/100 |
| 6,571,833 B1 | * | 6/2003 | McLarty, III et al. | 138/116 |

FOREIGN PATENT DOCUMENTS

| | | |
|---|---|---|
| EP | 1 087 488 A1 | 3/2001 |
| WO | WO 98/07450 | 2/1998 |

OTHER PUBLICATIONS

"Vikimatic Aerial Self Support Duct" advertisement, Vikimatic Sales, Inc., Wadsworth, Ohio, 1 page (1995).
"TVC Aerial Hardware—Clamps" brochure, TVC Communications, Inc., Wadsworth, Ohio, 2 pages (2000).
"TVC Aerial Hardware—Arms & Braces" brochue, TVC Communications, Inc., Wadsworth, Ohio, 2 pages (2000).

* cited by examiner

Primary Examiner—James Hook
(74) Attorney, Agent, or Firm—Renner, Kenner, Greive, Bobak, Taylor & Weber

(57) ABSTRACT

A duct (10) is made up of a plurality of layers (11, 12, 13) of pliant material. The layers (11, 12, 13) are attached by stitching (20, 22) to form pockets (23, 24) between adjacent layers. One of the layers (11) is wider than the others and extends over the lateral edges (17, 19) of those layers (12, 13), and when the stitching (22) is applied, a loop (21) is formed. The loop (21) receives a strength member (26) which may be engaged by a clamp (31) carried by a bracket (34) which may be attached to a utility pole (30) to carry the duct (10) overhead. In another embodiment, a duct (40) includes enclosed loops (41, 42, 43) forming pockets (50, 51, 52). Stitching (54) connects the loops (41, 42, 43) and forms another loop (55) to receive a strength member (56). In yet another embodiment, the layers (61, 62, 63 and 64) are of different lateral widths, and the longest layer (64) extends around one of the edges of the other layers (61, 62, 63) to form a loop (71) when stitching (65) is applied. The loop (71) receives the strength member (73).

25 Claims, 4 Drawing Sheets

MULTI-COMPARTMENT AERIAL DUCT

CROSS-REFERENCE TO RELATED APPLICATION

This application claims the benefit of U.S. Provisional patent application Ser. No. 60/368,317 filed on Mar. 29, 2002.

TECHNICAL FIELD

This invention relates to a duct which is adapted to be carried overhead by utility poles or the like and which can itself carry multiple communication cables or the like in separate compartments.

BACKGROUND ART

Conduits or ducts which are designed to carry communication and other cables or the like are typically either buried in a network formed in the ground or carried overhead by utility poles. The aerial system is far less expensive to install and maintain, and thus, where utility poles are available, it is the preferred system.

Known aerial ducts merely consist of a tube, usually formed of some high tensile strength plastic material, such as high density polyethylene, which can be attached to the utility poles and which provides a single compartment within the tube for the passage of a communication cable or the like. Such tubes are normally provided at the work site on reels. However, because of their density and weight, it is only feasible to provide a limited length of the tubing on a reel. Moreover, because of its weight, the tube is expensive to ship and install. In particular, the high coefficient of friction between the cable and the tube precludes the installation of the cable by means of long pulls. Rather, only shorter lengths of cable can be pulled through the tube at one time.

Most significantly, the prior art aerial ducts are only designed to hold one cable. Thus, if after a cable is pulled through the system and is in use, if more communication capacity is needed, an additional cable cannot readily be pulled through the same tube. While such is possible, all of the problems discussed above are compounded in that it is very difficult and time consuming to attempt to pull a second cable into a tube that already has one cable randomly positioned therein. Thus, rather than merely adding a cable to an existing installed aerial system, the prior art generally dictates that a second system be installed when increased capacity is desired.

DISCLOSURE OF THE INVENTION

It is thus an object of the present invention to provide a duct which can readily be carried by utility poles or the like and which is formed with one or more pockets of a pliant or flexible material.

It is another object of the present invention to provide a duct, as above, which can carry more cables, and yet not consume any more space than the prior art ducts.

It is a further object of the present invention to provide a duct, as above, which is of a material which is resistant to the weather and the environment.

It is an additional object of the present invention to provide a duct, as above, which is lightweight and easy to install.

It is yet another object of the present invention to provide a duct, as above, which is of a material having a low coefficient of friction so that longer portions of cables may be pulled therethrough.

It is a still further object of the present invention to provide a duct, as above, which is configured so that large volumes thereof may be placed on, and shipped on, a reel.

These and other objects of the present invention, as well as the advantages thereof over existing prior art forms, which will become apparent from the description to follow, are accomplished by the improvements hereinafter described and claimed.

In general, a duct made in accordance with one aspect of the present invention includes a plurality of longitudinally extending layers of a pliant material. At least one longitudinally extending pocket is formed between at least one set of adjacent layers. A loop is formed adjacent to the pockets and carries a strength member.

In accordance with another aspect of the duct of the present invention, the layers of material each have a first lateral edge spaced from a second lateral edge. The layers are attached to each other near their first lateral edges, and one of the layers has a portion which passes over the second lateral edges of the other layers. At least some of the layers are attached to each other near their second lateral edges and are attached to the one layer to not only form pockets between adjacent layers, but also to form a loop adjacent to the pockets.

In accordance with another embodiment of the present invention, a duct includes a plurality of enclosed loops positioned adjacent to each other and forming pockets. An additional loop is formed in one of the loops and a strength member is received in the additional loop.

According to another embodiment of the invention, a duct includes a plurality of longitudinally extending layers of material having different lateral widths. At least one longitudinally extending pocket is formed between adjacent layers. A loop is formed adjacent to each pocket and a strength member is received in the loop.

An aerial system adapted to carry cables between poles includes a duct having a plurality of pockets formed between layers of fabric. The duct includes a loop having a strength member therein. A clamp is adapted to be carried by a pole and engages the strength member so that the duct may be carried by the pole.

A preferred exemplary aerial duct incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
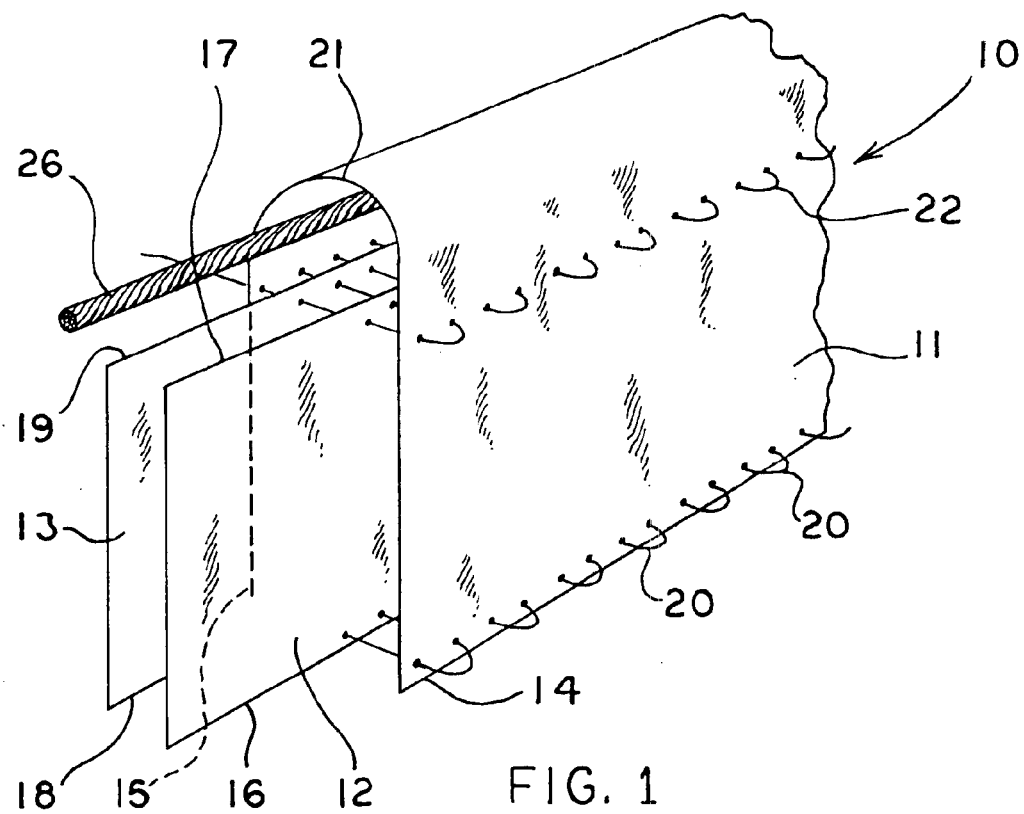
FIG. 1 is an exploded perspective view of a duct made in accordance with the concepts of the present invention.
Figure 2:
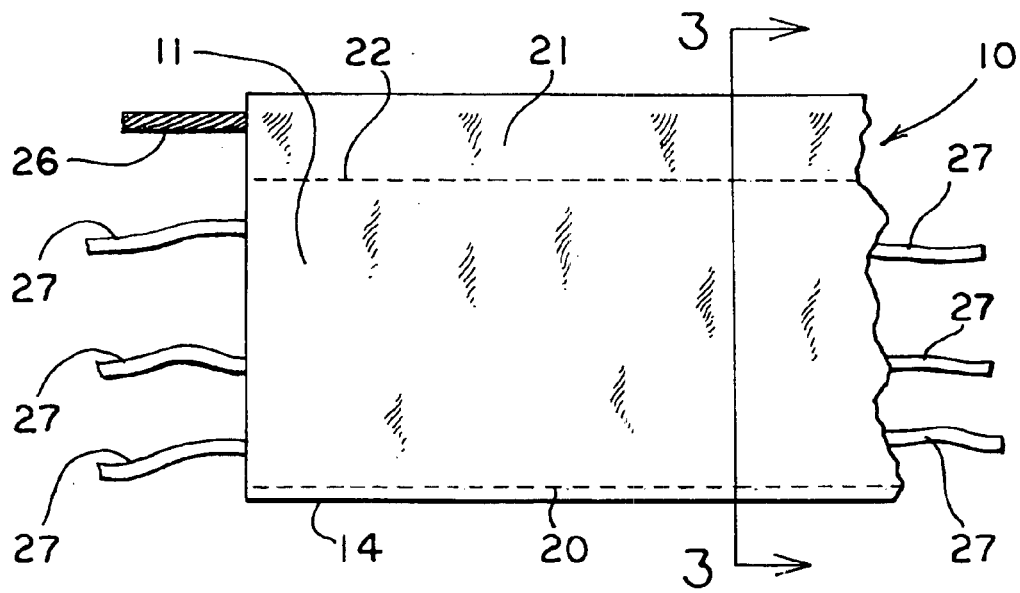
FIG. 2 is a fragmented side elevational view of the duct of the present invention assembled.

A duct which is especially suited for aerial applications is indicated generally by the numeral 10. Duct 10 includes a plurality of thin, pliant layers of material, three layers 11, 12, and 13 being shown by way of example. Layers 11, 12 and 13 extend in a longitudinal direction potentially for several thousand feet, and such a length of duct 10 may be stored on a reel for ease of shipment and installation. Layer 11 includes spaced lateral edges 14, 15, layer 12 includes spaced lateral edges 16, 17, and layer 13 includes spaced lateral edges 18, 19.

Layers 11, 12 and 13 may be attached near their lateral edges 14, 16 and 18, respectively, as by stitching 20 or the like. While stitching is the preferred manner to attach layers 11, 12 and 13, it should be evident, dependent on the precise material selected for layers 11, 12 and 13, that other forms of attachment such as heat fusing, ultrasonic welding, or the like could be employed.

As shown, it is preferable that the spacing between the lateral edges 16 and 17 of layer 12 and the lateral edges 18 and 19 of layer 13 be generally equal. That is, layers 12 and 13 are generally of the same width. A loop, generally indicated by the numeral 21, is formed adjacent to lateral edges 17 and 19 of layers 12 and 13, respectively. While loop 21 could be formed in several manners, as best shown in FIG. 1, it is most conveniently formed from layer 11 by extending layer 11 over the lateral edges 17 and 19. As such, layer 11 is initially formed wider than layers 12 and 13. That is, its lateral edges 14 and 15 are spaced a greater distance than the lateral edges of layers 12 and 13. As shown, layer 11 is approximately twice as wide as layers 12 and 13, and, as such, its edge 15 extends to a point generally adjacent to lateral edges 14, 16 and 18. However, as will be more fully hereinafter discussed, layer 11 could have its edge 15 terminate generally adjacent to lateral edges 17 and 19 of layers 12 and 13, respectively.

Loop 21 can be conveniently formed at the same time that the lateral end of duct 10 opposite edges 14, 16 and 18 is closed, by stitching 22 or its equivalent as previously described. Thus, stitching 22 extends through layer 12 near lateral edge 17, layer 13 near lateral edge 19, and extends through layer 11 at two locations, one location being a distance from lateral edge 14 generally equivalent to the width of layers 12 and 13, and the other location being a distance from lateral edge 15 generally equivalent to the width of layers 12 and 13. In this configuration, as shown in FIG. 1, stitching 20, previously described, will also extend through layer 11 twice, once near lateral edge 14 and the other time through layer 11 near lateral edge 15. However, as discussed above, if edge 15 of layer 11 were to be positioned generally adjacent to lateral edges 17 and 19, only stitching 22 would pass through layer 11 twice.

As a result of stitching 20 and 22, in addition to the formation of loop 21, pockets or compartments 23, 24 and 25 are also formed in duct 10 between adjacent sets of layers. Pocket 23 is thus formed between one portion of layer 11 and layer 12, pocket 24 is formed between layer 12 and layer 13, and pocket 25 is formed between layer 13 and the other portion of layer 11. Although a duct 10 with three pockets is thus being shown, it is to be understood in accordance with the present invention that as many pockets as desired may be formed in a duct 10. Thus, for example, if one were to provide and attach an additional layer of fabric, an additional pocket would be formed. Conversely, if, for example, lateral edge 15 of layer 11 were to terminate near stitching 22, which was previously suggested as a possibility, then only two pockets would be formed—unless additional intermediate layers would be added.

Duct 10 also includes a longitudinally extending stiffening and strength member 26 positioned in loop 21. Strength member 26 may be made of any suitable metallic or equivalent material, for example, in the form of a metal stranded cable, so as to provide duct 10 with a sufficient amount of stiffness or strength to enable it to be attached to an aerial system as will hereinafter be described.

Each pocket of duct 10 may also be provided with a conventional longitudinally extending pull tape 27. As is well known in the cable installation art, a cable, such as cable 28 shown in FIG. 4, may be installed in duct 10 by attaching it to a pull tape 27 at one longitudinal end of duct 10. Then, by pulling tape 27 at the other longitudinal end of duct 10, cable 28 is threaded through a pocket of duct 10. Ropes may be utilized instead of tapers 27, if desired.

So as to readily be able to receive a cable 28 therethrough, the pliant layers 11, 12 and 13 of duct 10 may be made of any suitable lightweight natural or synthetic fabric having a low coefficient of friction, high abrasion resistance and high tear resistance. The fabric should also not be water absorbent. The fabric disclosed in U.S. Pat. No. 6,304,698, which is incorporated herein by reference for whatever details may be necessary to understand this invention, if treated for protection from the weather and other environmental occurrences, such as ultraviolet light, would be one suitable fabric for duct 10.

Figure 5:
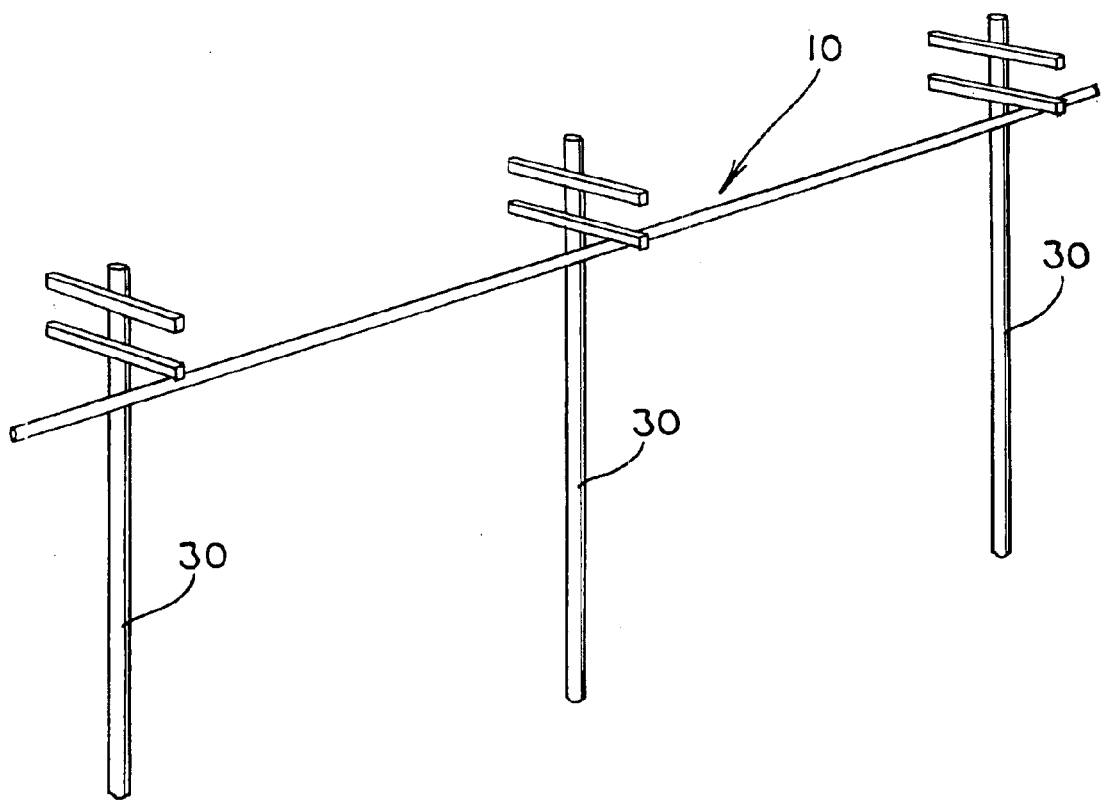
FIG. 5 is a schematic, perspective view showing the duct being carried by utility poles.
Figure 6:
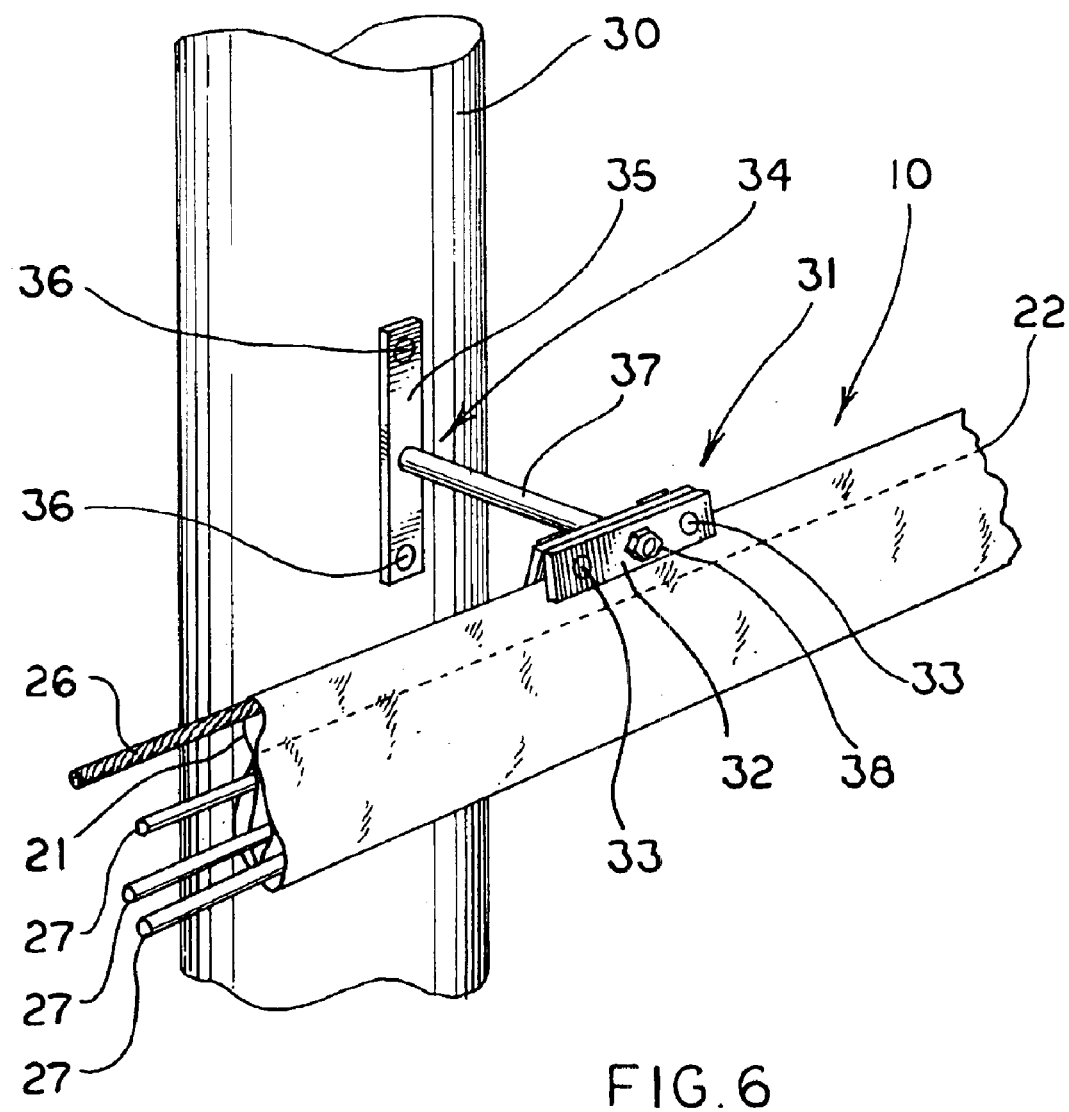
FIG. 6 is a fragmented, somewhat schematic, perspective view showing the manner in which the duct is carried by a utility pole.

As is schematically shown in FIG. 5, duct 10 is particularly suited for being carried by a system of utility poles 30. Thus, duct 10 is preferably connected to each pole 30 and spans the space therebetween. The manner in which duct 10 may be connected to each pole 30 is shown in FIG. 6. There it can be seen that a clamp, generally indicated by the numeral 31, has opposed jaws 32 which can receive and otherwise engage the strength member 26 which is positioned in loop 21. Bolts 33 are tightened so that jaws 32 securely engage member 26, and thus, duct 10. An extension bracket, generally indicated by the numeral 34, includes a base 35 which can be attached to a pole 30 as by fasteners 36 and an arm 37 extending outwardly from base 35. Arm 37 can be attached to clamp 31 by a fastener 38 so that duct 10 is supported from poles 30 at the desired clearance distance.

Figure 3:
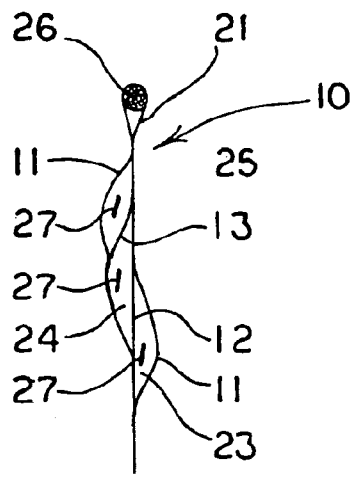
FIG. 3 is an enlarged sectional view taken substantially along line 3—3 of FIG. 2.
Figure 4:
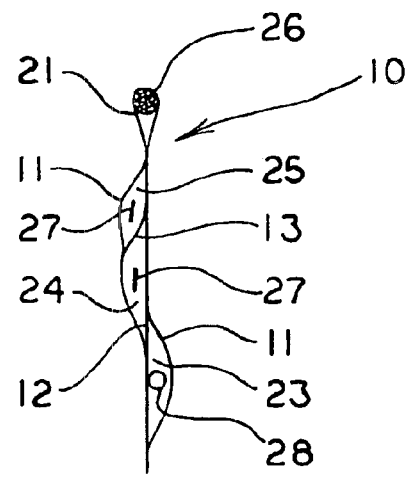
FIG. 4 is an enlarged view similar to FIG. 3 but showing one cable in the duct.

As previously described, when initially installed, duct 10 will usually have a pull tape 27 positioned in each pocket 23, 24 and 25. As shown in FIG. 3, such results in a duct having a very narrow end profile. That is, its total thickness is only the thickness of layers 11, 12 and 13 and that of tapes 27. In fact, FIG. 3 is an exaggerated depiction of the total thickness of duct 10 which, in reality, would only be no more than about 0.125 inch thick. As such, it presents very little top surface areas for the accumulation of ice, snow, dust and the like. Even when a cable 28 is installed in one of the pockets 23, 24, or 25, as shown in FIG. 4, the thickness of a portion of duct 10 would rarely exceed an inch, and thus, surface accumulations of snow and the like is again avoided.

Figure 7:
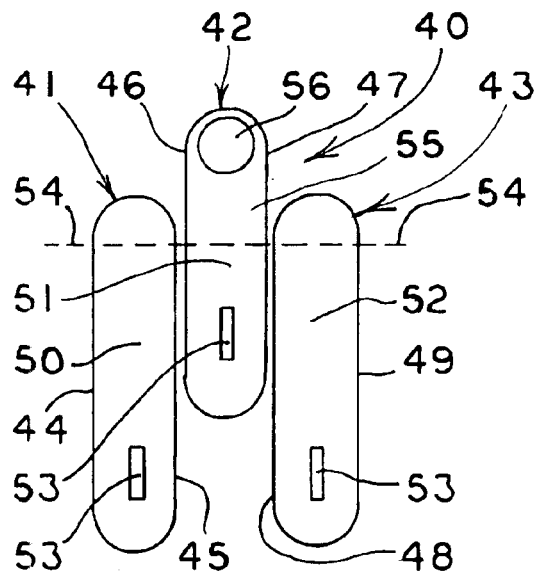
FIG. 7 is a somewhat schematic view, like the sectional view of FIG. 3, of an alternative embodiment of a duct of the present invention before the layers of material are attached.

An alternative embodiment of the duct of the present invention is schematically shown in FIG. 7 and indicated generally by the numeral 40. Duct 40 is shown as including three enclosed loops 41, 42 and 43 of a pliant material of the same type of material as duct 10. Loop 41 thus includes a set of adjacent layers 44 and 45, loop 42 includes a set of adjacent layers 46 and 47, and loop 43 includes a set of adjacent layers 48 and 49. A pocket or compartment 50 is thus formed in loop 41 between layers 44 and 45, a pocket or compartment 51 is formed in loop 42 between layers 46 and 47, and a pocket or compartment 52 is formed in loop 43 between layers 48 and 49. Each pocket may be provided with a pull tape 53 which, like tape 27 of the embodiment of FIGS. 1–6, may be used to pull a cable into a pocket of duct 40.

As shown in FIG. 7, loops 41, 42 and 43 are of the same length, but when they are connected, as by stitching 54 or an equivalent attachment, the ends of loop 42 are not aligned with the ends of loops 41 and 43. As such, when stitching 54 is applied, a second pocket or loop 55 is formed within loop 42. Pocket 55 is shown as carrying a strength member 56, which like strength member 26, enables duct 40 to be attached to an aerial system such as shown in FIG. 6.

Figure 8:
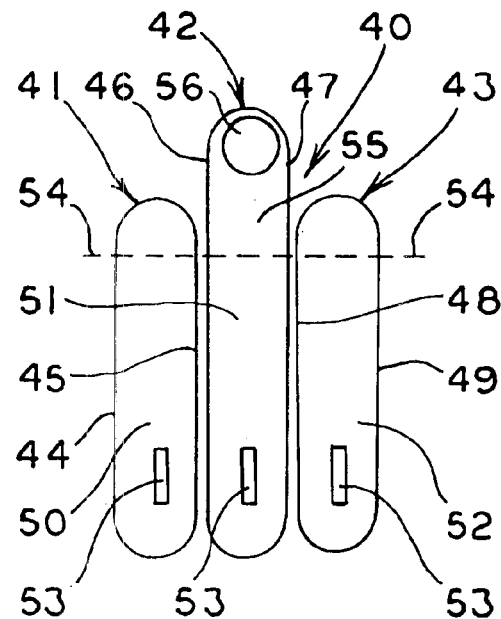
FIG. 8 is a somewhat schematic view, like FIG. 7, but showing a slightly different version of the duct of FIG. 7.
Figure 9:
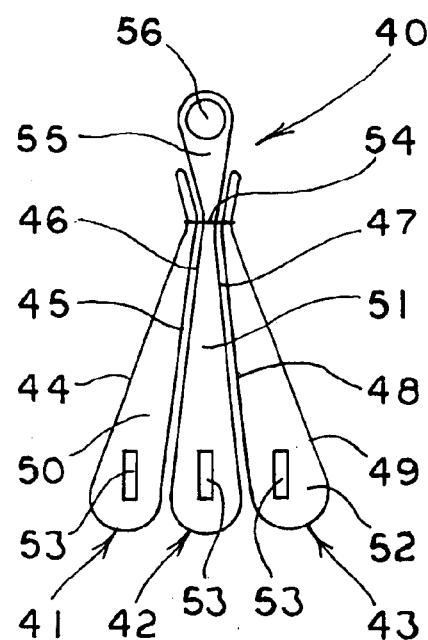
FIG. 9 is a view like FIG. 8 but showing the layers of material attached.

FIG. 8 shows the duct 40 with one modification. That is, as shown, loops 41, 42 and 43 are not of equal length. Rather, loop 42 is longer than loops 41 and 43. As such, pockets 50, 51 and 52 are generally of the same size while pocket 55 is still formed to carry strength member 56. FIG. 9 shows duct 40 of FIG. 8 after the stitching 54 has been applied to attach layers 44–49.

Figure 10:
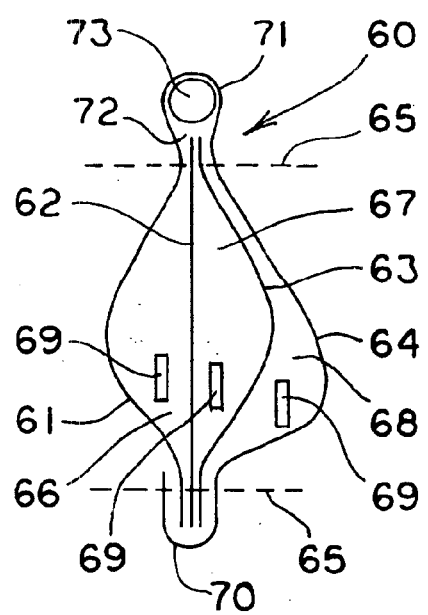
FIG. 10 is a somewhat schematic view, like the sectional view of FIG. 3, of yet another alternative embodiment of a duct of the present invention before the layers of material are fully attached.

Another embodiment of the duct of the present invention is schematically shown in FIG. 10 and indicated generally by the numeral 60. Duct 60 is made up of a plurality of layers of a pliant material, preferably the same material described with respect to the other embodiments. Thus, duct 60 includes layers 61, 62, 63 and 64 which are preferably of differing lateral widths so that when they are connected near their lateral edges, as by stitching 65 or an equivalent attachment, the layers will buckle to form compartments or pockets 66, 67 and 68 between adjacent sets of layers. As in the other embodiments, pockets 66, 67 and 68 may be provided with a pull tape 69 to be utilized to install a cable in each pocket when desired.

The longest layer, layer 64, may be provided with a cuff 70 that is received around one lateral edge of layers 61, 62 and 63 prior to applying stitching 65. Thus, stitching 65 will extend through layer 64 twice at the area of cuff 70. A loop 71 is formed at the other lateral edge of layer 64 prior to applying stitching 65, and thus, stitching 65 will extend through layer 64 twice at the area of loop 71. Loop 71 forms a pocket 72 to receive a strength member 73 which enables duct 60 to be attached to an aerial system such as shown in FIG. 6.

It should also be appreciated that duct 60 could be formed of one continuous piece of material with the stitching 65 forming the pockets between the layers of that continuous piece of material.

In view of the foregoing, it should be evident that a duct constructed in accordance with any of the embodiments described herein is very useful for aerial applications, accomplishes the objects of the present invention, and otherwise substantially improves the art.

What is claimed is:

1. An aerial system adapted to carry cables between poles comprising a duct having a plurality of longitudinally extending layers of a pliant material, said layers having lateral edges, at least one longitudinally extending pocket formed between at least one set of adjacent layers, a longitudinally extending pulling mechanism positioned in each said pocket, nothing other than said pulling mechanism being positioned in each said pocket, a loop formed adjacent to each said pocket, said loop being formed by one of said layers extending over said lateral edges of the other said layers, and a strength member received in said loop, said loop and said strength member being positioned to be engaged so that said duct may be carried by the poles.

2. The aerial system according to claim 1 wherein said loop is formed of said pliant material.

3. The aerial system according to claim 1 wherein said longitudinally extending pulling mechanism is a pull tape.

4. The aerial system according to claim 1, wherein said layers are connected near said lateral edges so as to form each said pocket.

5. The aerial system according to claim 4 further comprising stitching to connect said layers near each said lateral edges.

6. The aerial system according to claim 5 wherein said stitching at one of said lateral edges also forms said loop.

7. The aerial system according to claim 1 wherein said layers are of different lateral widths.

8. A system adapted to be carried overhead by a pole having an arm attached thereto, and a clamp carried by said arm, the system including a duct comprising a plurality of longitudinally extending layers of a pliant material, said layers having lateral edges, at least one longitudinally extending pocket formed between at least one set of adjacent layers, a loop formed adjacent to each said pocket, said loop being formed by one of said layers extending over said lateral edges of the other said layers, and a strength member received in said loop, the clamp being adapted to engage said loop and said strength member.

9. A duct comprising a plurality of longitudinally extending layers of material, each layer having a first lateral edge spaced from a second lateral edge, said layers being attached to each other near said first lateral edges, one of said layers having a portion passing over said second lateral edges of the other of said layers, at least some of said layers being attached to each other near said second lateral edges and attached to said one layer to form pockets between adjacent layers, said portion of said one layer thereby forming a loop adjacent to said second lateral edges of the other of said layers.

10. The duct according to claim 9 further comprising a strength member positioned in said loop.

11. The duct according to claim 9 further comprising a longitudinally extending pull tape positioned in each said pocket.

12. The duct according to claim 9 wherein stitching attaches said second lateral edges of said layers to each other and to said one layer, said stitching thereby forming one lateral edge of each said pocket and forming said loop.

13. The duct according to claim 9 wherein the attachment of said first lateral edges of said layers to each other also attaches the second lateral edge of said one of said layers to the first lateral edges of said other layers.

14. A duct comprising a plurality of enclosed loops positioned adjacent to each other, said loops including layers of material forming pockets, an additional loop formed outside of said pockets by one of said loops, said additional loop having no layer in common with any of the other of said loops, and a strength member received in said additional loop.

15. The duct according to claim 14 further comprising stitching to attach said enclosed loops to each other and to form said additional loop.

16. The duct according to claim 15 wherein said one of said enclosed loops is larger than the other said enclosed loops.

17. The duct according to claim 14 wherein said enclosed loops are formed of a pliant material.

18. A duct comprising a plurality of longitudinally extending layers of material having lateral edges and being of different lateral widths, at least one longitudinally extending pocket formed between adjacent layers, the lateral edge of the longest layer extending around the lateral edges of the other layers thereby forming a loop adjacent to said lateral edges of the other layers, and a strength member received in said loop.

19. The duct according to claim 18 further comprising stitching to attach the lateral edges of said layers to each other.

20. The duct according to claim 18 wherein said layers are formed of a pliant material.

21. An aerial system adapted to carry cables between poles comprising a duct having a plurality of pockets formed between adjacent layers of fabric and including a loop, said layers having lateral edges which are connected to form said pockets, one of said layers extending over said lateral edges of the other said layers to form said loop, a strength member positioned in said loop, and a clamp adapted to be carried by a pole and engaging said loop and said strength member so that said duct may be carried by the pole.

22. The system of claim 21 further comprising an arm adapted to be carried by the pole, said arm being connected to said clamp.

23. The system of claim 21 further comprising a longitudinally extending pull tape in each said pocket.

24. An aerial system adapted to carry cables between poles comprising a duct having a plurality of pockets formed between adjacent layers of fabric and including a loop, said layers having lateral edges, one of said layers extending over said lateral edges of the other said layers to form said loop, means to connect said layers to form said pockets, said means to connect also forming said loop, a strength member positioned in said loop, and a clamp adapted to be carried by a pole and engaging said strength member so that said duct may be carried by the pole.

25. An aerial system adapted to carry cables between poles comprising a duct having a plurality of pockets formed between adjacent layers of fabric and including a loop, said layers having lateral edges which are connected to form said pockets, one of said layers extending over said lateral edges of the other said layers to form said loop, and a strength member positioned in said loop, said loop and said strength member adapted to be engaged so that said duct may be carried by the pole.

* * * * *